United States Patent [19] — Levine
// Patent Number: 5,692,214
// Date of Patent: Nov. 25, 1997

[54] SYSTEM FOR UNATTENDED RECORDING OF VIDEO PROGRAMS BY REMOTE CONTROL CODE TRANSMITTER MODULE WHICH RECEIVES USER SELECTIONS FROM A PERSONAL COMPUTER

[76] Inventor: Michael R. Levine, 2122 NW. 60th Cir., Boca Raton, Fla. 33496

[21] Appl. No.: 287,343

[22] Filed: Aug. 8, 1994

Related U.S. Application Data

[63] Continuation-in-part of Ser. No. 848,338, Mar. 9, 1992, abandoned, which is a continuation-in-part of Ser. No. 802,249, Dec. 4, 1991, abandoned, which is a continuation-in-part of Ser. No. 796,702, Nov. 21, 1991, abandoned, which is a continuation-in-part of Ser. No. 595,393, Oct. 10, 1990, abandoned, which is a continuation of Ser. No. 484,175, Feb. 23, 1990, Pat. No. 4,963,994, which is a continuation of Ser. No. 213,162, Jun. 29, 1988, Pat. No. 4,908,713, which is a continuation of Ser. No. 634,179, Jul. 24, 1984, abandoned, which is a continuation of Ser. No. 330,111, Dec. 14, 1981, abandoned.

[51] Int. Cl.⁶ ..................................................... G06F 13/00
[52] U.S. Cl. .................. 395/833; 395/200.09; 395/327; 395/352; 395/557; 395/527; 395/610; 364/705.05; 348/906; 345/169; 358/335
[58] Field of Search ................................. 395/825, 826, 395/828, 600, 200.09, 327, 352, 557, 610, 883; 358/335, 142; 340/825; 364/705.05; 345/169; 348/906

[56] References Cited

U.S. PATENT DOCUMENTS

| | | | |
|---|---|---|---|
| 4,540,851 | 9/1985 | Hashimoto | 179/2 A |
| 4,566,034 | 1/1986 | Harger et al. | 358/194.1 |
| 4,598,288 | 7/1986 | Yarbrough et al. | 340/825 |
| 4,641,205 | 2/1987 | Beyers, Jr. | 360/33.1 |
| 4,751,578 | 6/1988 | Reiter et al. | 358/183 |
| 4,807,052 | 2/1989 | Amano | 358/194.1 |
| 4,825,200 | 4/1989 | Evans et al. | 341/23 |
| 4,908,707 | 3/1990 | Kinghorn | 358/147 |
| 4,908,713 | 3/1990 | Levine | 358/335 |
| 5,038,211 | 8/1991 | Hallenbeck | 358/142 |
| 5,086,385 | 2/1992 | Launey et al. | 364/188 |
| 5,151,789 | 9/1992 | Young | 358/194.1 |
| 5,179,439 | 1/1993 | Hashimoto | 358/86 |
| 5,260,788 | 11/1993 | Takano et al. | 358/142 |
| 5,307,173 | 4/1994 | Yuen et al. | 358/335 |
| 5,327,554 | 7/1994 | Palazzi, III et al. | 395/600 |
| 5,353,121 | 10/1994 | Young et al. | 348/563 |
| 5,390,027 | 2/1995 | Henmi et al. | 358/335 |
| 5,400,246 | 3/1995 | Wilson et al. | 364/146 |
| 5,412,377 | 5/1995 | Evans et al. | 340/825 |
| 5,412,720 | 5/1995 | Hoarty | 380/15 |
| 5,479,266 | 12/1995 | Young et al. | 358/335 |
| 5,479,268 | 12/1995 | Young et al. | 358/335 |
| 5,532,754 | 7/1996 | Young et al. | 348/569 |

FOREIGN PATENT DOCUMENTS 0493099  1/1992  European Pat. Off. .

Primary Examiner—Thomas C. Lee
Assistant Examiner—Ki S. Kim
Attorney, Agent, or Firm—Gifford, Krass, Groh, Sprinkle, Patmore, Anderson & Citkowski, PC

[57] ABSTRACT

A personal computer is used to assist in the selection of television programs to be recorded at future times and to control a video tape recorder to implement the selected recordings. An application program allows the computer to receive data representing a schedule of future programs. The operator can perform data base operations on the data to obtain listings of programs of particular interest. A program to be recorded is selected by moving a cursor into position with the display of the program listing on the computer. An output device generates infrared signals to control the video tape recorder and a cable box to tune and record a selected program.

23 Claims, 3 Drawing Sheets

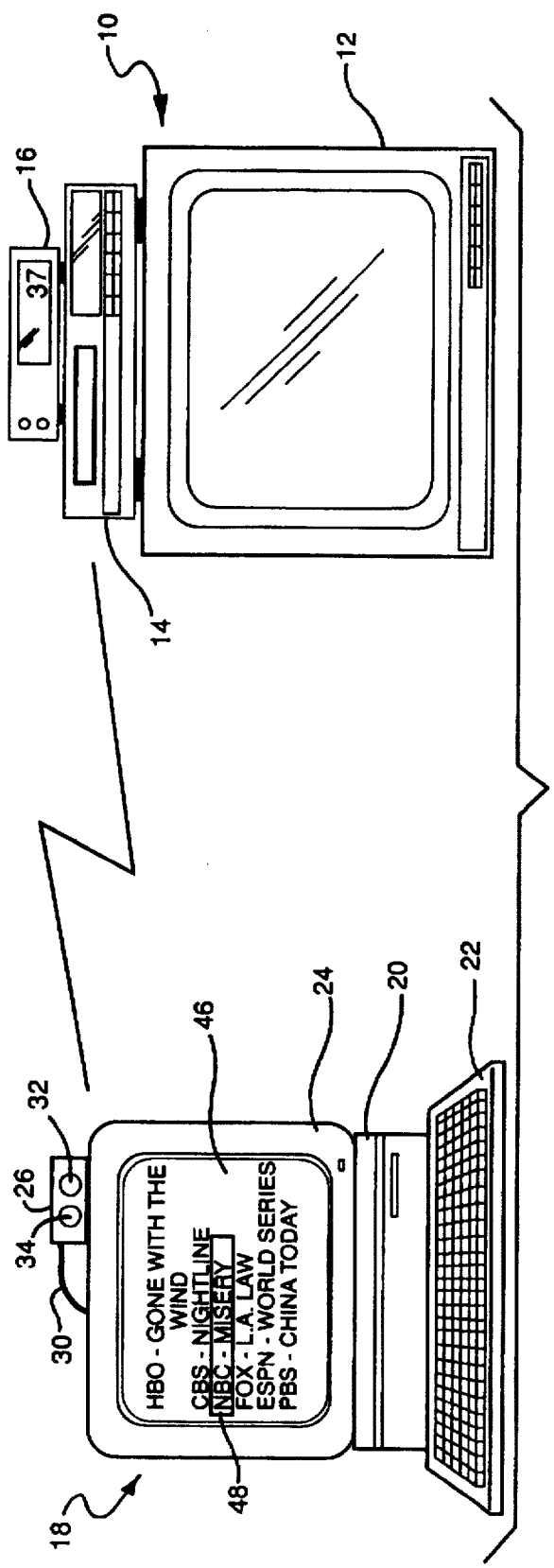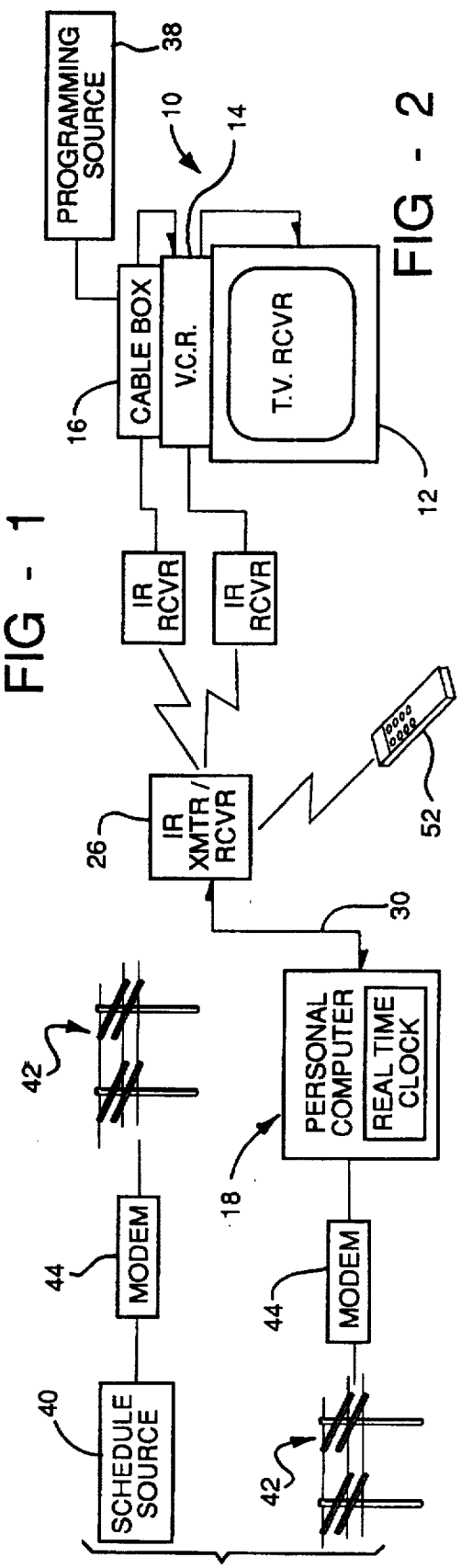
FIG - 1
FIG - 2

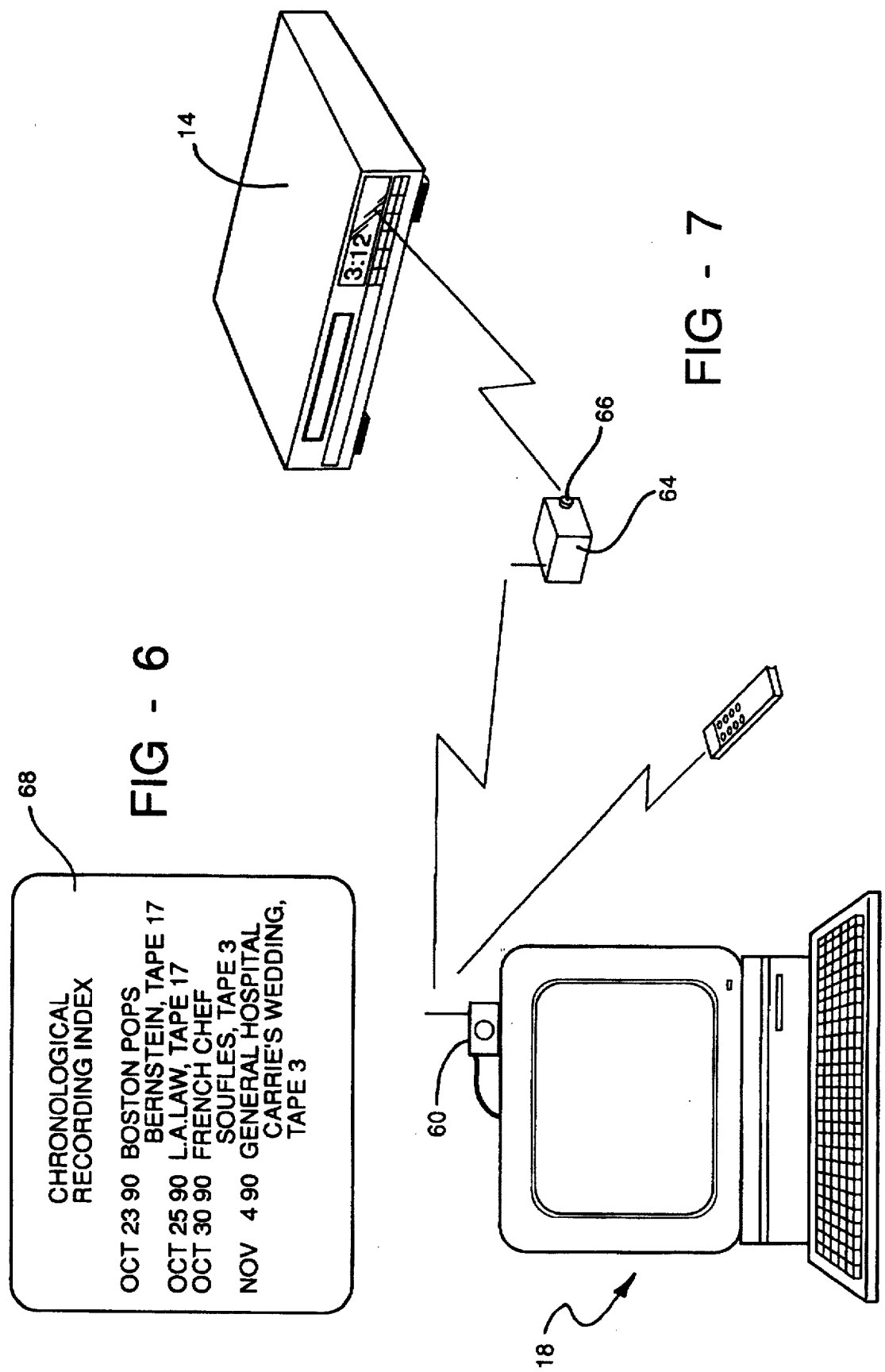

SYSTEM FOR UNATTENDED RECORDING OF VIDEO PROGRAMS BY REMOTE CONTROL CODE TRANSMITTER MODULE WHICH RECEIVES USER SELECTIONS FROM A PERSONAL COMPUTER

RELATED APPLICATIONS

This is a continuation-in-part of Ser. No. 07/848,338, filed Mar. 9, 1992 now abandoned, which is a continuation-in-part of Ser. No. 07/802,249, filed Dec. 4, 1991 (now abandoned), which is a continuation-in-part of Ser. No. 07/796,702, filed Nov. 21, 1991 now abandoned, which is a continuation-in-part of Ser. No. 07/595,393, filed Oct. 10, 1990 now abandoned, which is a continuation of Ser. No. 07/484,175, filed Feb. 23, 1990, (now U.S. Pat. No. 4,963,994), which is a continuation of Ser. No. 07/213,162, filed Jun. 29, 1988, (now U.S. Pat. No. 4,908,713) which is a continuation of Ser. No. 06/634,179 filed Jul. 4, 1984 (now abandoned), which is a continuation of Ser. No. 06/330,111, filed Dec. 14, 1981 (now abandoned).

FIELD OF THE INVENTION

This invention relates to a method and apparatus for controlling a video recorder to allow the unattended recording of future occurring programs using a personal computer and more particularly to such a method and apparatus which provides a display of a schedule of future programming available to the recorder on the personal computer.

BACKGROUND OF THE INVENTION

My U.S. Pat. No. 4,908,713 discloses a system for providing a schedule of future video programming available to a video recorder to a database memory located at the recorder so that the operator may display selected sections of the future schedule as an aid in choosing programs for recording. The schedule may be provided to the memory and updated either by broadcasting schedule information or by delivering disposable memories to the system on a subscription basis. Other of my applications disclose such systems in which the video recorder is programmed for unattended recording of a future program by simply pointing a cursor at the listing of that program on the schedule display. Since the system already stores the data required to record the program, it is unnecessary for the operator to re-enter the same data. My application Ser. No. 802,249 further discloses such a system in which the local memory stores the identification of programs that have been recorded and allows their display in order to select previously recorded programs for viewing.

These systems greatly simplify the problems of selecting programs for recording, actually performing the recording process, and viewing recorded programs. They suffer from the disadvantage of adding hardware and software to existing video cassette recorders or cable boxes which do not contain a schedule memory and a database program for selecting particular entries on the memory for display.

SUMMARY OF THE INVENTION

The present invention allows the implementation of the electronic schedule memory and cursor-based programming on a conventional video recorder through use of an associated personal computer which communicates with the video recorder via infrared signals of the type used for remote control of the video recorder. The infrared signals are preferably generated by a transmitter connected to an output port of the personal computer and are driven by signals generated by an application program run by the personal computer. The same transmitter may control the tuner of an associated cable box.

Future programming schedule information may be provided to the personal computer from a remote database by telephonic communication, by broadcast, or by subscription provision of disposable memories. The schedule information may be displayed on the monitor of the personal computer under control of a database program allowing chronological, alphabetical or topical selection and the operator may move a cursor on the display screen to point to a particular program to select it for future recording. The remote transmitter connected to the personal computer output port can send signals to the video recorder at the time the selection is made, allowing the future unattended programming memory of the video recorder to initiate the recording of a specific channel at the proper time or the remote may exercise control over the video recorder at the time the recording is to be made.

The personal computer transmitter may be instructed as to the particular code systems used by the video recorder remote control either by information transmitted from a remote database provider based on the identification of the make of the video recorder by the computer use, or through use of an initialization program which displays commands to the computer operator on the monitor of the personal computer directing the operator to press selected buttons on the remote transmitter provided with the video recorder. The computer program thus learns and stores the required remote codes. In the same manner, the personal computer can control an associated cable tuner to ensure that the channel specified for recording is provided to the VCR. The personal computer program can also store and display an index of programming that has been recorded by the system.

Through use of the method and apparatus of the present invention the advantages of an electronic schedule guide and cursor-controlled programming of the video recorder may be achieved without the provision of a specialized form of cassette recorder or cable box.

Other objectives, advantages and applications of the present invention will be made apparent by the following detailed description of the preferred embodiment of the invention. The description makes reference to the accompanying drawings in which:

DETAILED DESCRIPTION OF THE DRAWINGS

FIG. 1 illustrates a personal computer and television viewing system including a TV receiver, a video recorder and a cable box, implementing the preferred embodiment of the present invention;

FIG. 2 is a schematic diagram of the preferred embodiment of the invention;

Figure 5:
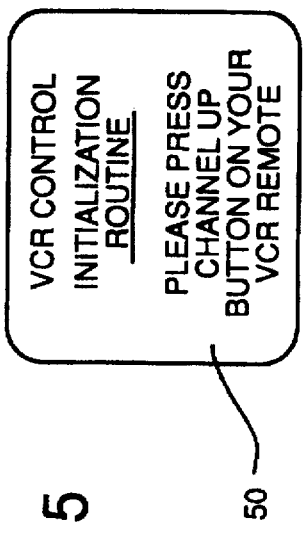
Figure 4:
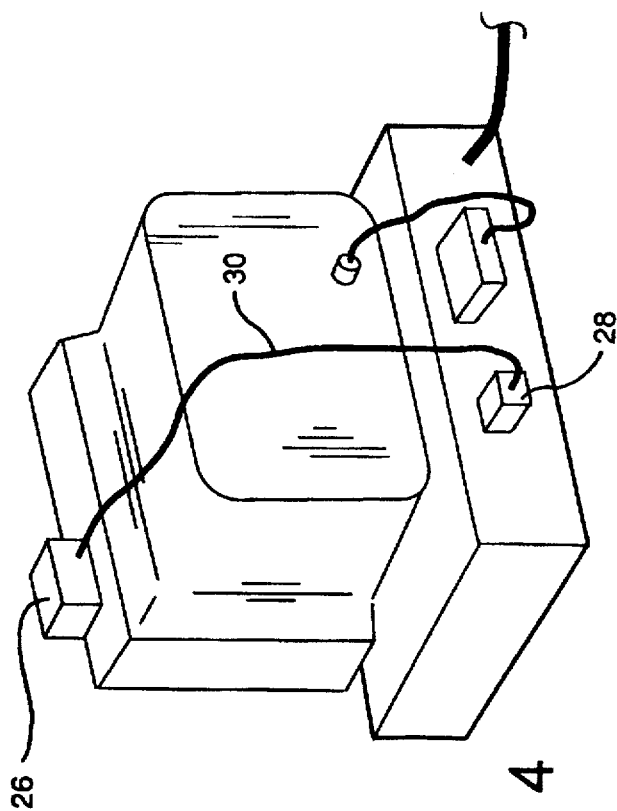
FIG. 4 is a perspective view of the rear of a personal computer illustrating the method of attachment of an infrared transmitter and receiver to an I/O port of the computer.

FIG. 5 is an illustration of a screen displayed on the personal computer monitor during an initialization procedure; and FIG. 6 is an illustration of a personal computer screen displaying an index of recorded programs and the tape cassettes on which each is recorded; and FIG. 7 is an illustration of a second embodiment of the invention in which the personal computer and video recorder are located remotely from one another and the output signals from the personal computer are transmitted by radio to an infrared transmitter for control of the video recorder.

DETAILED DESCRIPTION OF THE PREFERRED EMBODIMENT

Referring to FIG. 1, the preferred embodiment of the invention employs a television recording and receiving system, generally indicated at 10, comprising a conventional television receiver 12, a video cassette recorder 14 and a cable tuner and descrambler box 16. A variety of known forms of interconnection can be made between the cable box 16, the recorder 14 and the television receiver 12 to allow either the recording or viewing of programs tuned by the cable box 16 or the simultaneous viewing of one program and the recording of another. The present invention is equally applicable to broadcast receiver systems which do not employ a cable box and to satellite receivers.

The video recorder 14 will normally be of the type employing an infrared remote control (not shown) as will the tuner in the cable box 16. The VCR 14 may, but need not necessarily, incorporate a future, unattended recording memory which includes a real time clock (not shown).

The method and apparatus of the present invention further utilizes a conventional personal computer, generally indicated at 18, incorporating a main computer housing 20, a keyboard 22 and a monitor 24. The term "personal computer" is used broadly to incorporate work stations, minicomputers and portable units.

The personal computer 18 is conventional but is provided with a special application program to implement the present invention. The organization of this application program is well within the skill of a programmer using the functional description of the program provided herein.

An infrared transmitter and receiver 26 is connected to an I/O port of the personal computer, preferably a parallel port, by a male connector 28 and a cable 30. The infrared unit 26 incorporates a conventional infrared signal detector 32 and an infrared emitter 34. In alternative embodiments the signals could represent other forms of electromagnetic or supersonic transmission, "infrared" is hereinafter used to define the generic form of signals.

The infrared signals emitted by the unit 26 are picked up by the infrared remote receiver of the video recorder 14 and may also be picked up by the infrared recorder of the cable box 16 to control its tuner.

The application program is loaded into the personal computer via a diskette or the like. The program requires as data the schedule of future programming available to the system 10 from a programming source 38, such as a cable or the like, for a particular period of time such as a week or month.

In the preferred embodiment of the invention the schedule information is provided to the personal computer 18 from a remote database 40, which may constitute a database provider such as "COMPUSERVE," "PRODIGY" or the like. This information may be customized for the cable service 38 available to the system through an initialization routine in which the computer operator keys in the postal ZIP code of his location and, if necessary, an identification of the cable service provider. The head end database uses this information to provide the computer 18 with the schedule of programming for that service. The operator of the personal computer system 18 may communicate with the schedule source over phone lines 42 using modems 44 at each end. Alternatively, the personal computer could employ a program in which the system automatically communicates with the schedule source 40 at predetermined periods, such as each morning at 4:00 a.m. or the like, to update the schedule stored in the personal computer 18. As another alternative, diskettes could mailed out to the personal computer on a subscription basis or the schedule information could be provided to the personal computer via cablecast or broadcast.

Through use of a database program employing menus, submenus and the like, the operator may obtain a display of programming for a particular period of time, such as that illustrated at 46 in FIG. 1. To select a listed program for future recording the operator may move a cursor 48 into super-position with the listing. Alternatively, two or three digit numbers could be associated with each listing and the operator could signal a programming selection by hitting an appropriate number on the keyboard 22.

Figure 3:
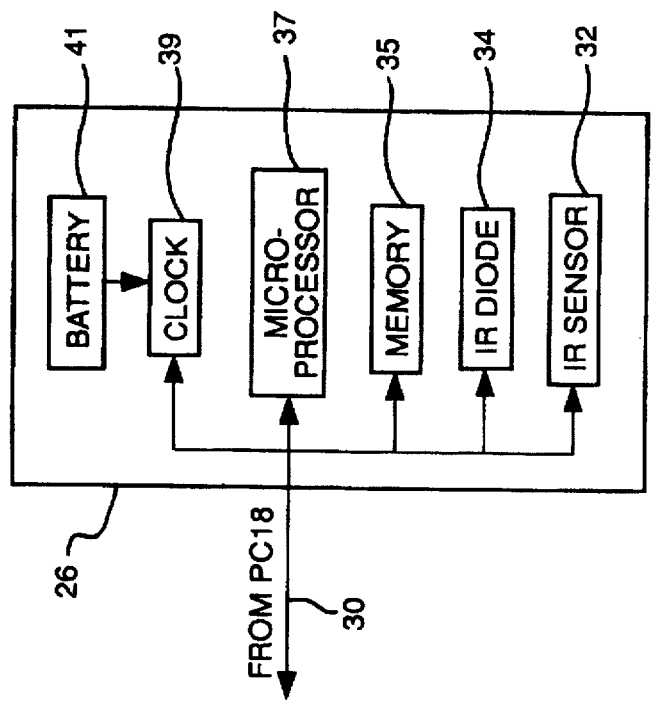
FIG. 3 is a schematic diagram of the IR transmitter/receiver.

In the preferred embodiment of the invention this selection transfers information relating to the programming selection to a memory 35 within the IR unit 26 (FIG. 3). The unit 26 also includes a microprocessor 37, a real time clock 39 and a power supply battery 41. The microprocessor 37 continually compares the present time signal from the clock 39 with the start time of the programs to be recorded as stored in the memory 35 and sends an appropriate infrared code to the VCR 14 (and, if appropriate, the cable box 16) at the start time. A similar signal at the programmed conclusion time of the program terminates the recording. This arrangement eliminates the need for the computer to continually remain in the on state.

In alternative embodiments of the invention employing programmable cable tuners or programmable satellite receivers, the infrared transmissions could be used to program these units.

Alternatively, the control signals to the IR unit 26 may be provided in real time by the computer 18 under control of its internal clock. The IR unit might then simply consist of an IR diode connected to the personal computer 18 by a long wire so the diode may be placed near the receiver 10. At the time the recording is to be initiated, the personal computer transmits signals from an I/O port through the cable 30 to the infrared transmitter/receiver 26. The unit 26 then send signals to the video cassette recorder 14, which tune the set to the required channel and initiates the recording. Signals might also be sent to the cable box 16 to cause it to tune to the appropriate channel. As a third alternative, when the operator makes a programming selection, the information relating to that selection, including channel and the start and stop time could be immediately sent from unit 26 to video cassette recorder 14 to program the recorder for the future unattended recording of the desired program.

Alternatively the unit 26 may be detachable from the computer 18 so that after it is loaded with data on programs to be recorded it may be detached and moved into proximity with the receiver system 10, which may be located in another room.

To perform the transmission function, the personal computer 18 requires information as to the nature of the remote control codes used by the video recorder 14 and the cable box 16 if that is additionally to be controlled. Preferably, this information is provided from the remote database 40 during an initialization routine in which the operator keys in the identification of the make and model of the VCR and cable box. Alternatively, to acquire this information, the application program for the personal computer may go through an initialization routine using screens of the type illustrated at 50 in FIG. 5. These screens advise the computer operator to press selected buttons on the remote control transmitter 52 for the VCR 14 or the transmitter for the cable box 16. The personal computer application program receives signals from the IR sensor 32 and stores these codes for use in transmitting control signals to the video recorder 14 and the cable box 16. The application program may alternatively store a database of the control codes for popular video recorders or cable boxes and thus allow the unit to be identified by only pressing one or two selected keys, or it may require the operator to go through all of the keys in order to develop the appropriate remote control schedule.

In another embodiment of the invention the unit 26 includes sound detection apparatus. This provides several advantages, including the ability to receive information in acoustic form either from the personal computer or over a telephone line, for example using an acoustic coupler. An increasing number of conventional personal computers are now provided in standard form with a sound generating capability, and even if not factory supplied, numerous sound-generating modules and add-on cards are widely available as options. With such a capability residing in the personal computer, information may be transmitted from the personal computer to the module 26 in acoustical form. For example, information pertaining to a program to be recorded may be delivered in this manner, as well as any control code information required for proper activation and/or tuning of other system components, including the video recorder or cable box, to ensure that the proper channel is tuned at the appropriate time.

The ability to accept an acoustical signal may further facilitate an entirely wireless implementation of module 26, and may also enable module 26 to be partially or completely compatible with automated VCR programming techniques, including the VCRPlus™ system which is currently being marketed commercially. With VCRPlus™ program listings include a multi-digit numerical code which is entered by an operator to bring about the automatic, unattended recording of a particular program without the need for entering a more sophisticated sequence of information such as program start time, stop time, channel tuning, and so forth, as is presently entered through typical on-screen programming sequences. Certain of the VCRPlus™ modules contain acoustic couplers, enabling them to be programmed over a standard telephone line. Utilizing this capability, a customer dials a service telephone number and informs a representative or uses touch tone codes to enter information such as VCR make/manufacturer, cable tuner make/manufacturer, and geographic information, for example, in the form of a zip code. Given this information, the system then down-loads the appropriate control codes to be used by the VCRPlus™ module to ensure that the entry of a VCRPlus™ numerical code records the desired program for that user in their particular geographic area.

The present invention may take advantage of some or all of the VCRPlus™ features or similar features of any similar automated programming system. If the database received and stored in the personal computer by the present invention includes encoded program information such as VCRPlus™ codes, these may be delivered directly from the personal computer to the module 26 instead of more detailed program-related information. Although presently available VCRPlus™ control units typically only receive control code information in acoustic form, with the numerical code associated with a desired program entered via keypad, such units contain all of the hardware necessary to accept the numerical code in acoustic form as well. In such a case, then, with the present invention storing a large database of programs in the personal computer, the VCRPlus™ code alone may be delivered to the remote unit 26 to bring about the desired programming sequence. In the event that the unit 26 includes a sound detection capability, the numerical code may be transmitted by the personal computer to the module 26 in acoustic form, in addition to the remote-control codes, which may also be delivered in acoustic form, either from the personal computer or over a phone line as is currently the case with the VCRPlus™ system. In the event that the personal computer is used to transmit the control codes to the module 26, regardless of the form in which such codes are delivered, a look-up table may be provided to the personal computer either in disk form or through a separate telephonic connection, and upon entry of equipment make/model and any required geographic information by the operator through the keyboard provided on the personal computer, a look-up may be carried out by the computer so that the appropriate control codes are used for all equipment involved.

The embodiment of the invention illustrated in FIG. 7 is utilized in systems where the cassette recorder 14 is located a large distance from the personal computer 18, such as in another room of the house. In this system the remote I/R transmitter 26 is replaced by a radio transmitter 60. The radio signals are received by a remote receiver 64 disposed physically in front of the video recorder 14. Receiver 64 includes an infrared transmitter 66 and the received radio signals are transmitted into serial infrared commands which are transmitted by the unit 64 to the infrared receiver of the video recorder 14.

The application program for the remote television receiver 18 may also maintain a database of the programs that have been recorded by the system and allow display of these programs on the monitor of the personal computer. The identifying information may include codes as to the nature of the program such as a tennis match, comedy, movie or the like to allow menu-driven database operations to be used in the selection of programming for viewing. The information may record storage location of the programming, in terms of video cassettes, which the operator may enter into the system via the keyboard. A typical screen of this index is illustrated at 68 in FIG. 6.

Having thus described my invention, I claim:

1. A system for an unattended recording of a video program by a remotely controlled video recorder connected to a video source, comprising:

a personal computer having a display and a first memory to receive and store a schedule of video programming available from the source, the schedule including program titles;

an application program resident on the personal computer enabling an operator to view portions of the schedule on the display and select one or more programs for recording by the video recorder; and an electronic module in communication with the personal computer, including:

means for receiving and storing information from the personal computer relating to a program to be recorded, a second memory for storing remote control codes associated with the operation of the video recorder, and a wireless remote-control transmitter operative to activate the video recorder using a control code previously stored in the second memory to record the program in accordance with the information received from the personal computer.

2. The system of claim 1, the personal computer including an output port to which the electronic module is connected to receive the information relating to a program to be recorded, the module being detachable therefrom to activate the video recorder.

3. The system of claim 1, the electronic module further including sound detection apparatus for receiving information in the form an acoustical signal.

4. The system of claim 3, the personal computer including sound-generation apparatus, the information received by the electronic module in the form an acoustical signal including the information from the personal computer relating to a program to be recorded.

5. The system of claim 3, the information received in the form an acoustical signal including the control codes associated with the operation of the video recorder.

6. The system of claim 3, the information received in the form an acoustical signal including the control codes associated with the operation of the video recorder.

7. The system of claim 1, the schedule of video programming including a numerical code associated with a program to be recorded, the information received by the electronic module from the personal computer including the numerical code.

8. The system of claim 1, the module further including a remote-control receiver to detect codes transmitted by the remote control unit supplied with the remotely controlled video recorder, enabling the module to ascertain and store the codes associated with the operation of the video recorder.

9. A system to bring about the unattended recording of a video program by a remotely controllable video recorder connected to a source of programs through a remotely controllable multi-channel tuner, the system comprising:
   a personal computer of conventional design including a display and a mass storage facility to receive a database of video programs available from the video source, including program title, date of occurrence, start time and channel tuning information;
   an application program to be executed by the personal computer which enables an operator to view portions of the database on the display and to select one or more of the video programs to be recorded; and
   a transmitter module in an enclosure separate from that of the personal computer, the module including:
   a data-input port,
   a memory,
   a time-keeping device,
   a wireless remote-control transmitter, and
   a central processing element connected to the data-input port, the memory, the time-keeping device, and the remote-control transmitter, the central processing element being pre-programmed to perform the following functions:
   cause the data-input port receive information from the personal computer relating to a program to be recorded, and store the information in the memory,
   compare the output of the time-keeping device with the information stored in the memory, and
   cause the remote-control transmitter to activate the video recorder and multi-channel tuner to record the program.

10. The system of claim 9, the remotely controllable multi-channel tuner forming part of the remotely controllable video recorder.

11. The system of claim 9, the remotely controllable multi-channel tuner forming part of a cable tuner.

12. The system of claim 9, including two remotely controllable multi-channel tuners, one forming part of the remotely controllable video recorder and the other forming part of a cable tuner.

13. The system of claim 9, the data-input port including an acoustic coupler to receive information in the form of an acoustic signal.

14. The system of claim 9, the memory within the transmitter module further storing control codes used to control the remotely controllable video recorder and multi-channel tuner.

15. The system of claim 9, wherein the information received from the personal computer includes program information in encrypted form.

16. The system of claim 15, wherein a program is encrypted in the form of a multi-digit numerical code.

17. A system for programming a video recorder having a remote control receiver for the unattended recording of programming from a video programming source connected to the video recorder, comprising:
   a personal computer;
   means within the personal computer for storing a database of future programming schedules including information relating to program identification and start time;
   a wireless remote control transmitter including a real-time clock, means for storing data received form the personal computer relative to a program to be recorded including the start time of such program, and circuitry within the transmitter operative to compare the output of the real time clock with the stored start time of a program to be recorded and operate the video recorder at the time of the occurrence of the program to be recorded; and
   an application program for the personal computer to transfer the data to the remote control transmitter to record a particular video program in accordance with information contained within the database being selected by a user of the personal computer.

18. The system of claim 17, including a remotely controllable cable tuner connected between the video programming source and the video recorder, the transmitter being further operative to send a signal to the cable tuner to record a particular video program in accordance with information contained within the database being selected by a user of the personal computer.

19. A method of programming a remotely controlled video recorder connected to a video source, comprising the steps of:
   providing a personal computer with a display device to which there is attached an electronic module having a wireless transmitter;
   receiving and storing, at the personal computer, a schedule of video programming available from the source, including the titles of available programs;
   reviewing by a user selected portions of the schedule on the display device;
   selecting by said user one or more of the displayed programs for recording by the video recorder;
   downloading and storing information relating to the program(s) selected for recording intothe electronic module; and
   transmitting a wireless remote-control signal from the electronic module to activate the video recorder in accordance with the information downloaded from the personal computer.

20. The method of claim 19, wherein the step of transmitting the wireless remote-control signal from the electronic module occurs immediately after the step of downloading information pertaining to that program into the module.

21. The method of claim 19, wherein the module includes a memory, and wherein the step of downloading information pertaining to the program(s) selected for recording into the electronic module includes downloading such information into the memory, and wherein the step of transmitting the wireless remote-control signal from the electronic module occurs at the time of occurrence of a program to be recorded by retrieving required information from the memory.

22. The method of claim 19, further including the step of physically detaching the electronic module from the personal computer prior to the step of transmitting the wireless remote-control signal to the video recorder.

23. The method of claim 19, further including the step of teaching the electronic module remote-control codes used in activating the video recorder.

* * * * *

UNITED STATES PATENT AND TRADEMARK OFFICE
CERTIFICATE OF CORRECTION

PATENT NO. : 5,692,214
DATED : November 25, 1997
INVENTOR(S) : Levine

It is certified that error appears in the above-indentified patent and that said Letters Patent is hereby corrected as shown below:

Title page, item
(63) Related U.S. Application Data

Lines 2-11: Delete from ", which is a continuation-in-part of Ser. No." to "330,111, Dec. 14, 1981, abandoned.".

Signed and Sealed this

Second Day of June, 1998

Attest:

BRUCE LEHMAN

Attesting Officer

Commissioner of Patents and Trademarks